(12) United States Patent
Hanakawa et al.

(10) Patent No.: US 7,390,047 B2
(45) Date of Patent: Jun. 24, 2008

(54) FRONT PART STRUCTURE OF VEHICLE BODY

(75) Inventors: Hidenari Hanakawa, Saitama (JP);
Takaaki Nagadome, Saitama (JP);
Takashi Yanagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/728,872

(22) Filed: Mar. 27, 2007

(65) Prior Publication Data

US 2007/0246971 A1 Oct. 25, 2007

(30) Foreign Application Priority Data

Apr. 20, 2006 (JP) ............... 2006-116562

(51) Int. Cl.
*B62D 25/14* (2006.01)

(52) U.S. Cl. ..................................... 296/70; 296/203.02

(58) Field of Classification Search ................... 296/70, 296/203.02, 192, 187.09, 203.01, 193.09
See application file for complete search history.

(56) References Cited

U.S. PATENT DOCUMENTS

| | | | | |
|---|---|---|---|---|
| 3,596,978 A | * | 8/1971 | Wessells et al. ........ | 296/203.02 |
| 4,146,263 A | * | 3/1979 | Watari ................... | 296/192 |
| 4,750,780 A | * | 6/1988 | Harasaki et al. ........ | 296/192 |
| 4,789,198 A | * | 12/1988 | Ide ....................... | 296/192 |
| 4,886,314 A | * | 12/1989 | Maeda ................... | 296/192 |
| 5,061,009 A | * | 10/1991 | Harasaki et al. ........ | 296/192 |
| 5,082,078 A | * | 1/1992 | Umeda et al. ........... | 296/70 |
| 5,364,158 A | * | 11/1994 | Watanabe et al. ....... | 296/187.09 |
| 6,086,144 A | * | 7/2000 | Kuwano ................. | 296/192 |
| 6,502,659 B2 | * | 1/2003 | Akasaka ................ | 180/309 |
| 7,048,326 B2 | * | 5/2006 | Yasui .................... | 296/203.02 |
| 2005/0269838 A1 | * | 12/2005 | Sohnshetty et al. .... | 296/203.02 |
| 2006/0175873 A1 | * | 8/2006 | Miyata et al. .......... | 296/203.02 |

FOREIGN PATENT DOCUMENTS

JP 2002-308149 10/2002

* cited by examiner

*Primary Examiner*—Kiran B. Patel
(74) *Attorney, Agent, or Firm*—Carrier, Blackman & Associates, PC; William D. Blackman; Joseph P. Carrier

(57) ABSTRACT

A front part structure of a vehicle body includes a dashboard upper part attached to right and left damper housings. The dashboard upper part includes a front part positioned forwardly of the vehicle body, and a reinforcing beam member. Jointly with the front part, the reinforcing beam defines a closed cross section.

6 Claims, 10 Drawing Sheets

US 7,390,047 B2

FRONT PART STRUCTURE OF VEHICLE BODY

CROSS-REFERENCE TO RELATED APPLICATIONS

The present application claims priority under 35 U.S.C. 119, based on Japanese patent application 2006-116562, filed 20 Apr. 2006. The entire disclosure of this priority document, including specification, claims, and drawings, is incorporated by reference herein.

FIELD OF THE INVENTION

The present invention relates to a vehicle body front part structure including damper housings attached to suspension systems, and a reinforcing beam coupled to the damper housings.

BACKGROUND OF THE INVENTION

Bars designed to extend between and reinforce strut towers attached to suspension systems are well known in JP-A-2002-308149. The disclosed bars will be discussed with reference to FIG. 11 hereof.

As shown in FIG. 11, a bar assembly 201 includes a bar body 202 and right and left attachment members 203R, 203L attached to right and left end portions of the bar body 202, respectively. The bar body 202 is a metal pipe. The right and left attachment members 203R, 203L made from metal plate are attached by means of bolts 207, 207 to right and left strut towers 205R, 205L.

The bar body 202 is made thick and heavy so as to provide a given strength. The right and left attachment members 203R, 203L are made from metal. Thus, the overall weight of the bar assembly 201 is heavy.

If the bar body 202 is used for a vehicle undergoing a larger load, the bar body 202 would not only become greater in size, but also it would be difficult to increase strength of the right and left attachment members 203R, 203L.

SUMMARY OF THE INVENTION

An object of the present invention is to provide a vehicle body front part structure designed to have lightened weight and increased strength for supporting shock absorbers of suspension systems.

According to the present invention, there is provided a front part structure of a vehicle body, comprising: a dash panel partitioning a passenger compartment and an engine space; a dashboard upper part disposed on an upper part of the dash panel in such a manner as to extend laterally of the vehicle body; and right and left damper housings to which upper parts of shock absorbers are allowed to be attached, the damper housings forming sidewalls that partly define the engine space, wherein the dashboard upper part includes: a front part forming a fore-part of the dashboard upper part and extending laterally of the vehicle body to the right and left damper housings; and a reinforcing beam member attached to the right and left damper housings and lying on the front part so as to form, jointly with the front part, a beam part having a first closed cross section and extending between the right and left damper housings.

The front part and the reinforcing beam member may be thin so as to lighten the closed cross-sectional beam part. The closed cross-sectional beam part of such a lightweight makes it possible to lighten structures supporting the shock absorbers. The closed cross-sectional beam part increases strengths of the structures supporting the shock absorbers.

The closed cross-sectional beam part may have hole portions formed adjacent right and left edges thereof. The hole portions are necessary for attachment of the shock absorbers to the damper housings and attached to the damper housings. The attachment of the hole portions to the damper housings can increase the strengths of the structures supporting the shock absorbers.

Desirably, an adhesive is interposed between the dashboard upper part and each of the right and left damper housings.

By virtue of this adhesive, rainwater or the like having flowed along the dashboard upper part and reached clearances between the dash-board upper part and the damper housings is prevented from entering the engine space.

Preferably, the beam part comprises partition walls each positioned between a longitudinally-central part of the beam part and a respective beam part end to be attached to the right or left damper housing.

With these partition walls, the right and left ends of the beam part of closed cross-section are strengthened, thereby strengthening the structures for supporting the shock absorbers.

Desirably, the reinforcing beam member comprises a center member laid on the dashboard upper part to thereby define a second closed cross section continuous with the first closed cross section.

Preferably, the reinforcing beam member comprises a center member, and the partition walls are provided at opposite ends of the center member.

Desirably, the reinforcing beam member further comprises right and left side members attached to opposite ends of the center member and covering upper parts of the right and left damper housings, to which upper parts the dashboard upper part is attached, and the second closed cross section extends from the right and left side members to the upper parts of the right and left damper housings

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
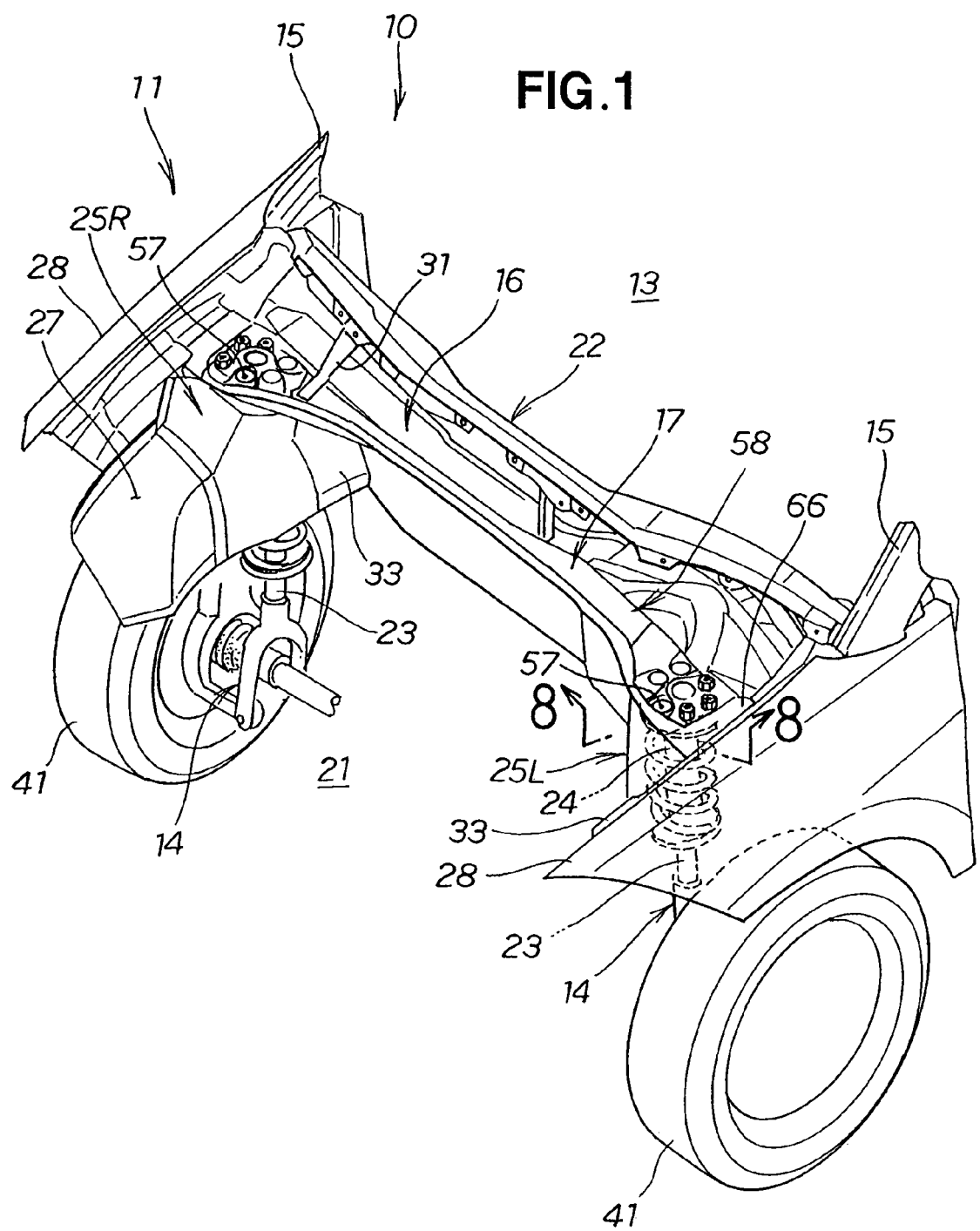
FIG. 1 is a perspective view of a vehicle body front part structure according to the present invention.
Figure 2:
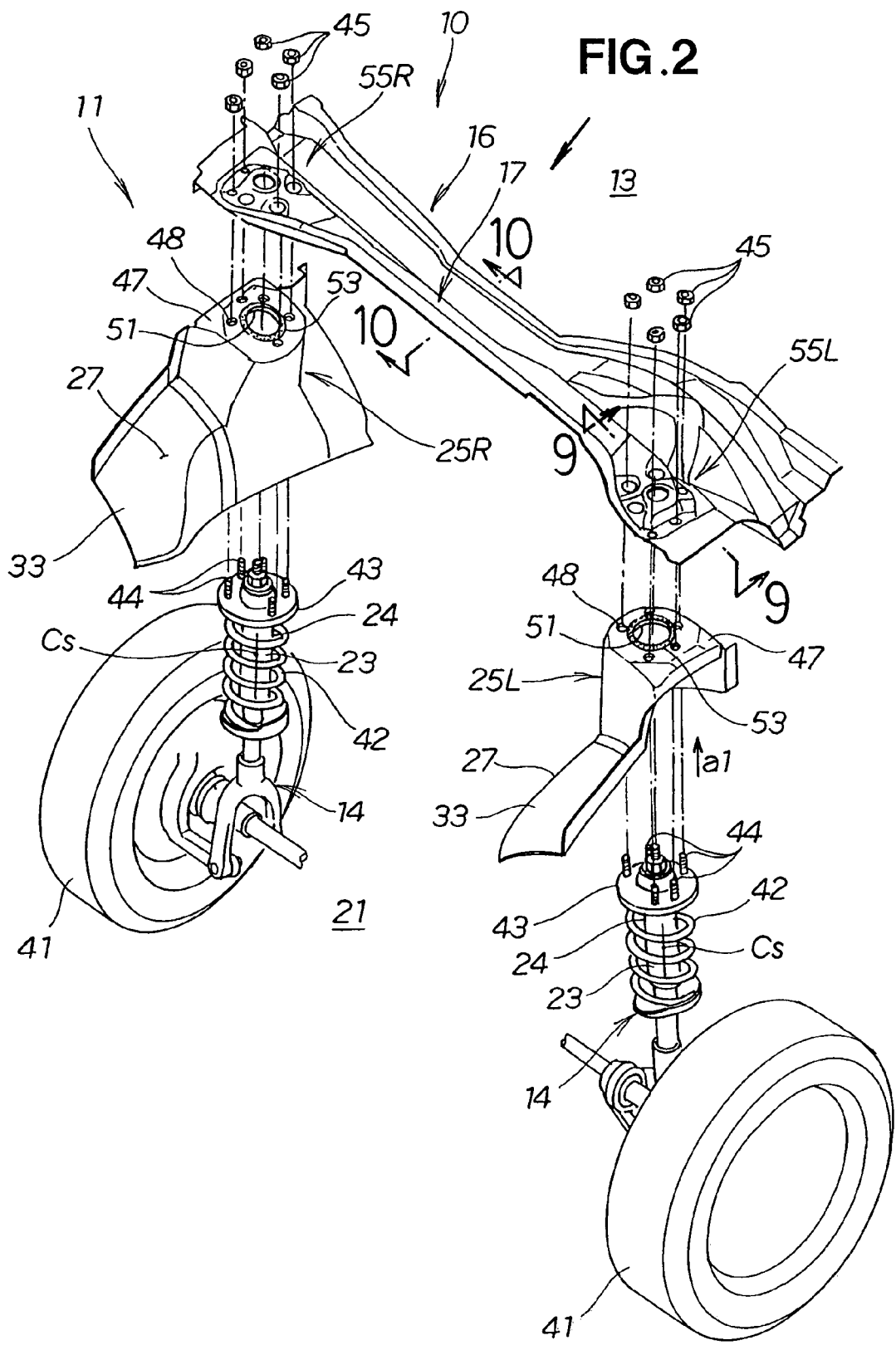
FIG. 2 is a perspective view of the vehicle body front part structure as disassembled into a dashboard panel assembly and damper housings, with a dash panel omitted for clarity.

As shown in FIG. 1 and FIG. 2, a vehicle 10 includes a vehicle body front part structure 11. The front part structure 11 includes a dash panel 22 joined to right and left front pillars 15, 15 and separating a passenger compartment 13 from an engine space 21, an dashboard upper part 16 attached through a hanger member 31 to an upper part of the dash panel 22, right and left damper housings 25R, 25L attached to upper parts 24, 24 of the shock absorbers 23, 23 of right and left front suspension systems 14, 14, right and left wheel houses 27, 27 contiguous with the right and left damper housings 25R, 25L, respectively, and right and left fender panels 28, 28 connected to the right and left wheel houses 27, 27, respectively.

The right and left damper housings 25R, 25L and the right and left rear wheel houses 27, 27 have their side walls 33, 33 defining sidewalls of the engine space 21.

The right and left front suspension systems 14, 14 suspend right and left vehicle wheels 41, 41. The suspension systems 14, 14 include the right and left shock absorbers 23, 23 for absorbing impact energy acting on the right and left vehicle wheels 41, 41, respectively, and right and left springs 42, 42. The upper parts 24 of the right and left shock absorbers 23, 23 include right and left attachment flanges 43, 43, respectively. Each attachment flange 43 carries a plurality of angularly spaced bolts 44 fixed thereon. The right and left attachment flanges 43, 43 of the upper parts 24, 24 of the shock absorbers 23, 23 are secured to the right and left damper housings 25R, 25L, respectively, with nuts 45 fastened to the bolts 44.

Each damper housing 25R or 25L includes a top plate portion 47 to which the attachment flange 43 of the shock absorber 23 is secured. The top plate portion 47 has a hole 51 formed through a center thereof for assisting in appropriately positioning the shock absorber 23 relative to the damper housing before the shock absorber 23 is secured to the damper housing. The top plate portion 47 also has a plurality of damper holes 48 formed around the hole 51 for allowing the bolts 44 secured on the flange 43 to pass through the damper holes 48. The top plate portion 47 carries an adhesive 53 along its inner peripheral edge defining the hole 51.

Discussion will be made as to a manner of assembling the vehicle body front part structure with reference to FIG. 1 and FIG. 2.

First, an adhesive 53 is applied along the hole-defining inner peripheral edge of the top plate portion 47 of each of the damper housings 25R, 25L. Secondly, there is provided a dashboard panel assembly (not designated) which the dashboard upper part 16 and a reinforcing beam member 17 attached to the dashboard upper part 16 constitute. The dashboard panel assembly has right and left end portions defining right and left damper-fastening structures 55R, 55L, respectively. Such structures 55R, 55L of the dashboard panel assembly are set onto the right and left damper housings 25R, 25L, respectively. Finally, the dashboard panel assembly is spot-welded to the upper part of the dash panel 22 with the damper-fastening structures 55R, 55L spot-welded to the damper housings 25R, 25L at spot-welded portions 57, 57.

Thereafter, the right and left front suspension systems 14, 14 are lifted up to the right and left damper housings 25R, 25L, as shown by arrow a1, in such a manner that the shock absorbers 23, 23 are positioned appropriately relative to the damper housings 25R, 25L. Thereafter, the shock absorbers 23, 23, the damper housings 25R, 25L and the dashboard panel assembly are secured together by means of the bolts 44 and the nuts 45.

Figure 3:
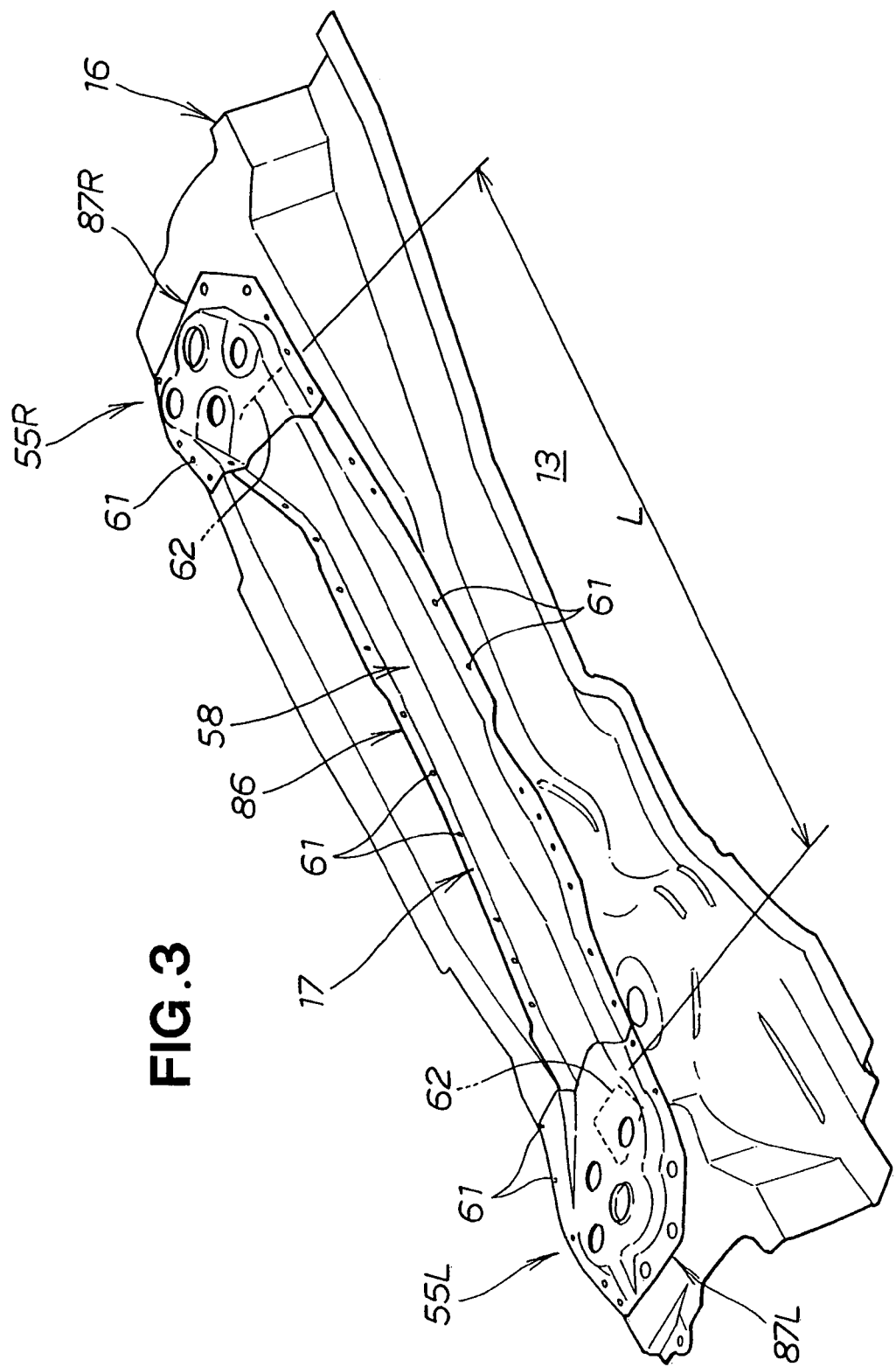
FIG. 3 is a perspective view of the dashboard panel assembly including an dashboard upper part and a reinforcing beam member coupled to the dashboard upper part.

Referring to FIG. 3, there is shown the dashboard panel assembly including the dashboard upper part 16 and the reinforcing beam member 17. The right and left damper-fastening structures 55R, 55L of the dashboard panel assembly are positioned in such a manner as to correspond to the bolts 44 and the nuts 45 for securing the shock absorbers 23, 23 to the damper-fastening structures 55R, 55L via the damper housings 25R, 25L. The dashboard panel assembly has a closed cross-sectional beam part 58 between the right and left damper-fastening structures 55R, 55L. The right and left damper-fastening structures 55R, 55L and the beam 58 are formed by spot-welding the reinforcing beam member 17 to the dashboard upper part 16.

The closed cross-sectional beam part 58 is elongated and connected to the right and left damper-fastening structures 55R, 55L. The beam 58 includes a center portion and partition walls 62, 62 contiguous with the center portion. The center portion of the beam 58 has the entire length L.

Figure 4:
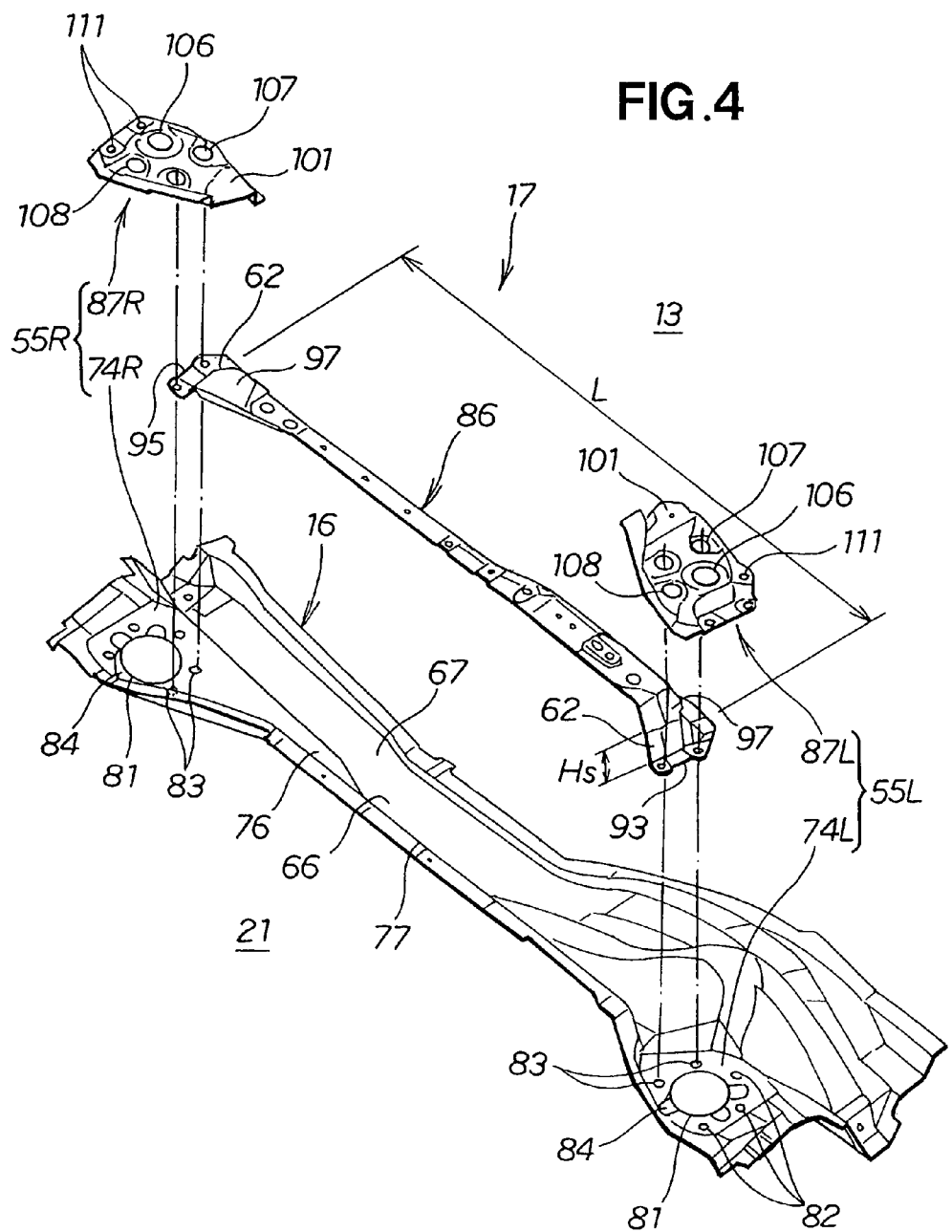
FIG. 4 is a view showing in perspective the dashboard upper part with the reinforcing beam member disassembled.
Figure 5:
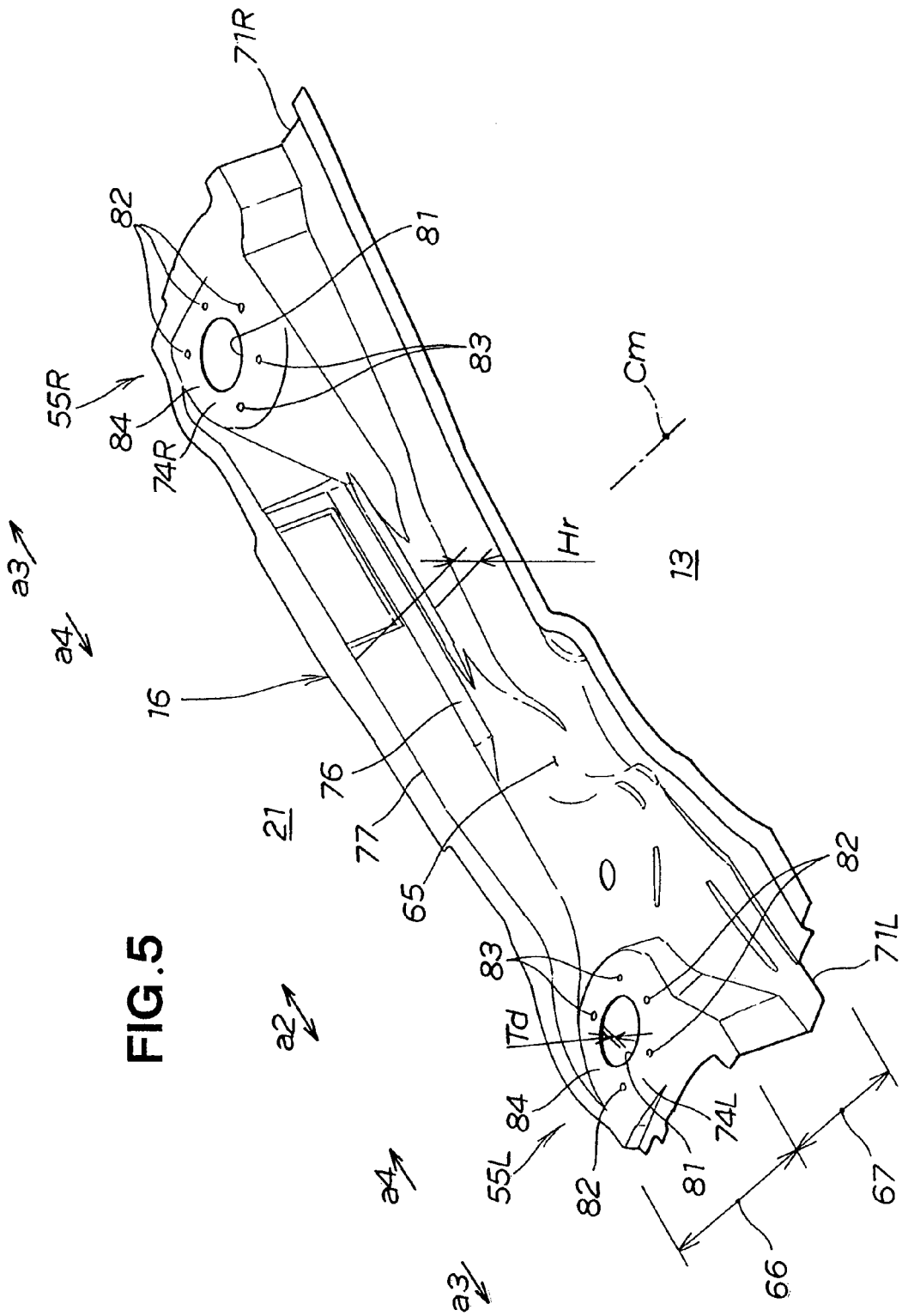
FIG. 5 is a perspective view of the dashboard upper part.
Figure 6:
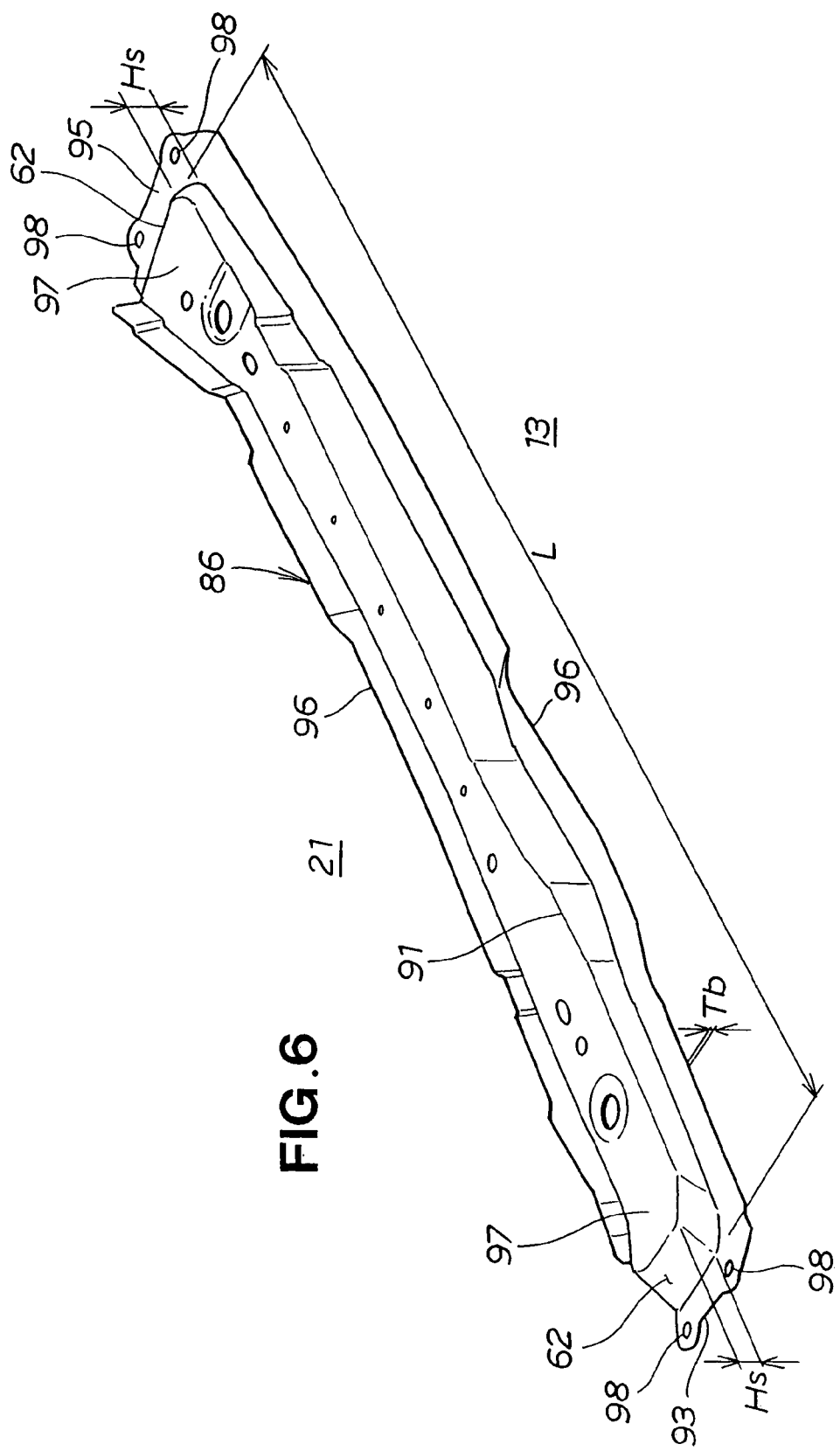
FIG. 6 is a perspective view showing a center member of the reinforcing beam member.

Referring to FIG. 4, the partition wall 62 has a height Hs (see FIG. 6, too). The partition wall 62 is positioned above the damper housing 25. Turning next to FIG. 5, the dashboard upper part 16 includes a dashboard panel body 65 having a front part 66, defined on an engine space side of the body 65, and a rear part 67 contiguous with the front part 66 and defined on a passenger-compartment side of the body 65. The front and rear parts 66, 67 have their right and left ends defining side connection ends 71R, 71L. The rear part 67 of the body 65 of the dashboard upper part 16 serves the same function as that of a conventional dashboard. The front part 66 of the body 65 of the dashboard upper part 16 has a thickness Td (see FIG. 8, too).

With reference to FIG. 4 and FIG. 5, the left damper-fastening structure 55L includes a lower section 74L defining a lower layer of the structure 55L. The lower section 74L also defines a left side end of the front part 66 of the dashboard panel body 65 of the dashboard upper part 16. The lower section 74L of the damper-fastening structure 55L lies in a plane perpendicular to a central axis Cs (FIG. 2) of the shock absorber 23.

Figure 10:
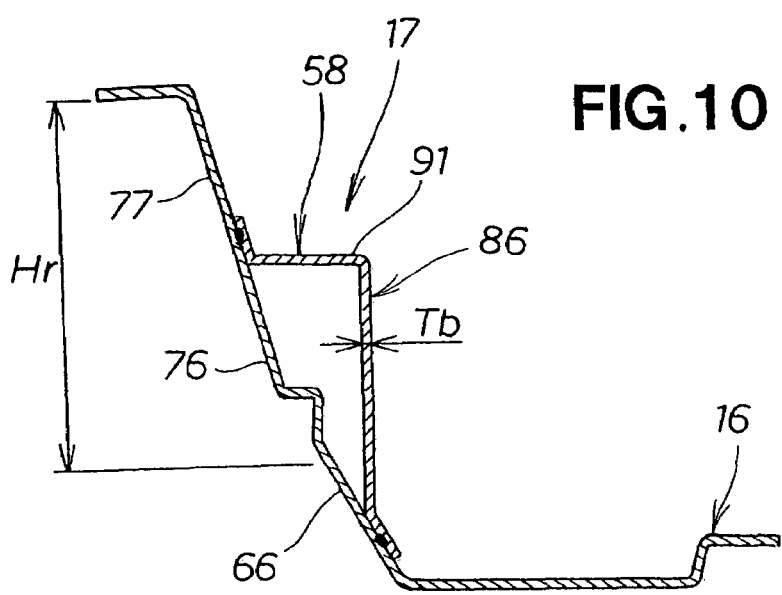
FIG. 10 is a cross-sectional view taken along line 10-10 of FIG. 2.

The right damper-fastening structure 55R includes a lower section 74R defining a lower layer of the structure 55R. The lower section 74R also defines a right side end of the front part 66. The lower section 74R lies in a plane perpendicular to a central axis Cs (FIG. 2) of the shock absorber 23. The front part 66 of the body 65 of the dashboard upper part 16 includes a first half 76 defined between the lower section 74L and the lower section 74R. The front part 66 also includes a front erected rib 77 contiguous with the first half 76. The rib 77 has a maximum height Hr (see FIG. 10, too).

The lower section 74L has a first hole 81 formed through a center thereof in correspondence to the shock absorber 23. The first hole 81 assists in positioning the shock absorber 23 appropriately relative to the dashboard upper part 16 before securing the shock absorber 23 to the dashboard panel assembly and the damper housing 25L.

The lower section 74L has three holes 82 at its inner peripheral edge defining the first hole 81. The three holes 82 correspond to the three bolts 44 (FIG. 2) fixed on transversely outside edge of the flange 43 of the shock absorber 23. It is noted that the term "transversely" means directions shown by an arrow a2 of FIG. 5 and the term "outside" means directions shown by arrows a3, a3 of FIG. 5. The lower section 74L also has two holes 83 at the first-hole-defining peripheral edge thereof. The two holes 83 correspond to the two bolts 44 (FIG. 2) fixed on transversely inside edge of the flange 43 of the shock absorber 23. It is noted that the term "inside" means directions shown by arrows a4, a4.

The lower section 74R has a first hole 51, three holes 82 and two holes 83, as does the lower section 74L. The left lower section 74L has a weld area 84 defined on an engine space side of the first-hole-defining peripheral edge of the lower section 74L. The right lower section 74R has a weld area 84 defined on an engine space side of the first-hole-defining peripheral edge of the lower section 74R. Each of the weld areas 84, 84 provides the aforementioned spot-welded portion 57 when the respective fastening structures 55R, 55L are spot-welded to the damper housings 25R, 25L. The lower section 74L is symmetric with the lower section 74R with respect to a center line Cm.

The reinforcing beam member 17 is spot-welded to the first half 76 and the right and left side ends (right and left lower sections 74R, 74L) of the front part 66 at the spot-welded portions 61 (FIG. 3) formed along peripheral edges of the lower sections 74R, 74L and the reinforcing beam member 17, with the closed cross-sectional beam part 58 defined between the right and left damper-fastening structures 55R, 55L.

Figure 7:
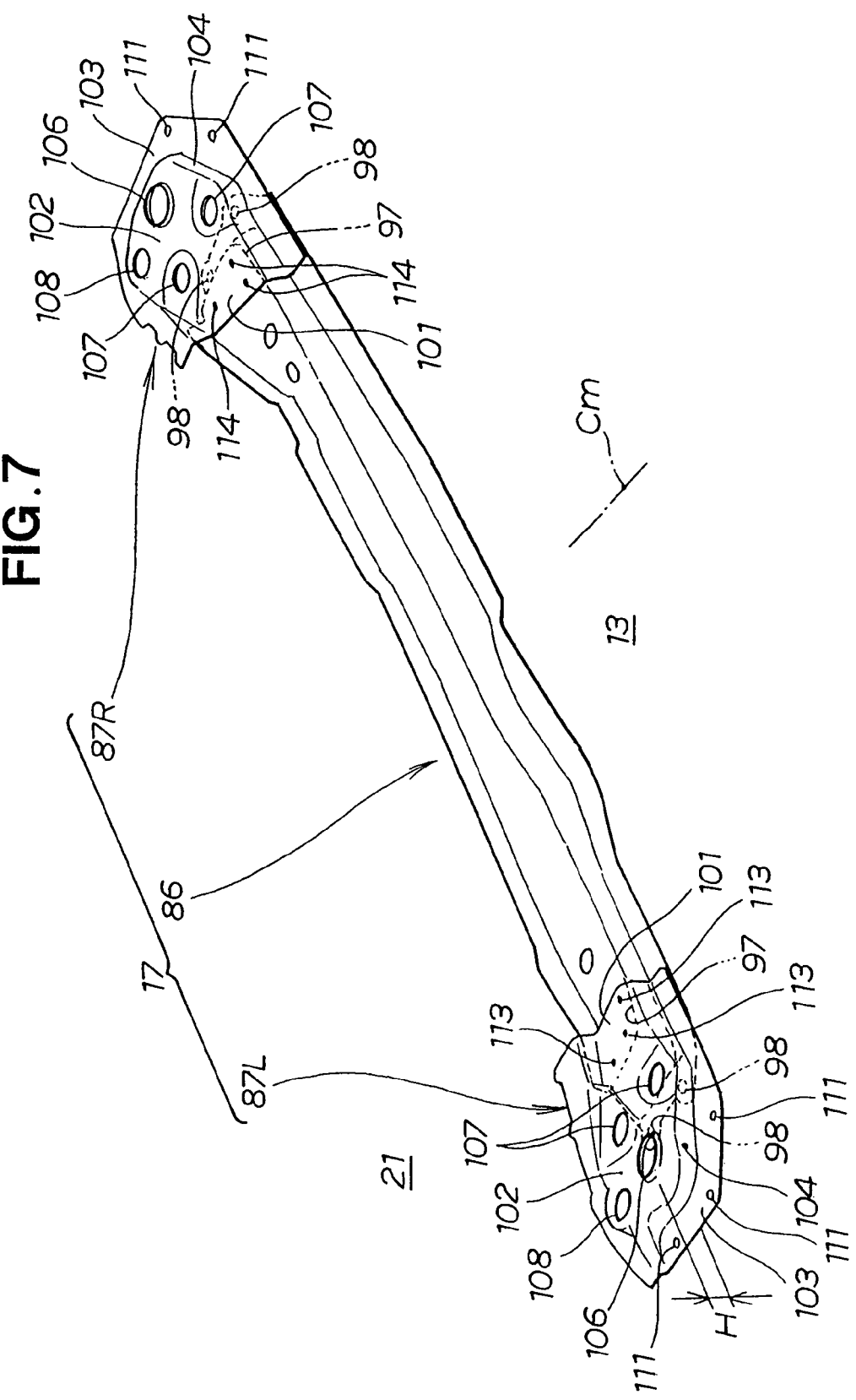
FIG. 7 is a perspective view of the reinforcing beam member with the side members attached to the center member.

The reinforcing beam member 17 includes a center member 86 and right and left side members 87R, 87L attached to right and left side end portions of the center member 86, as best shown in FIG. 7.

Figure 8:
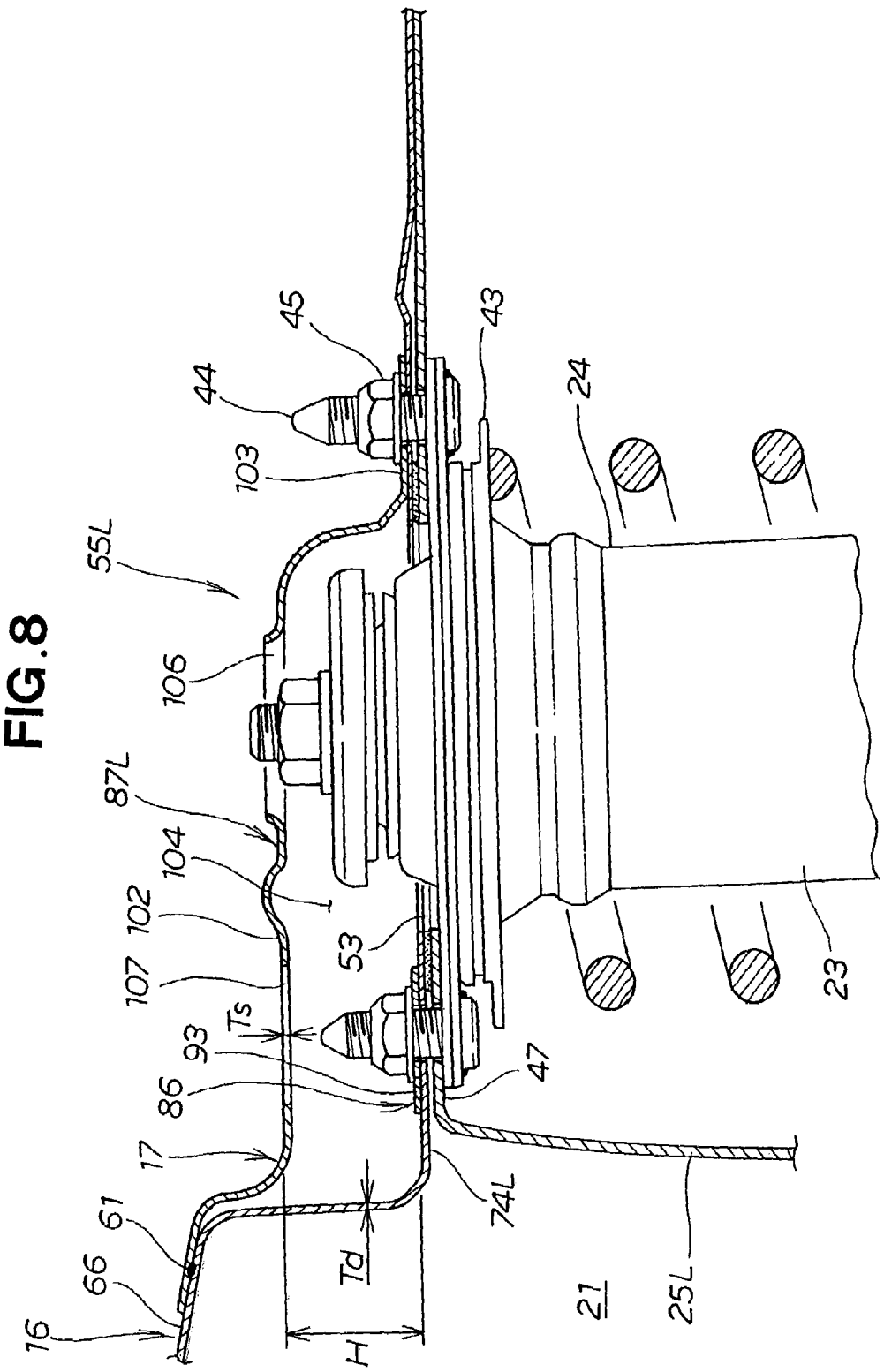
FIG. 8 is a cross-sectional view taken along line 8-8 of FIG. 1.

Referring to FIG. 6, there is illustrated the center member 86 of the reinforcing beam member 17. The center member 86 includes a second half 91 of L-shaped cross-section. The second half 91 has a length L. The second half 91 of the center member 86 and the first half 76 of the front part 66 of the dashboard upper part 16 jointly define the beam 58 of closed cross-section (see FIG. 10, too). The second half 91 has a left edge defining the partition wall 62. The center member 86 includes an inner fastening/welding portion 93 contiguous with the left partition wall 62. The inner fastening/welding portion 93 is fastened by means of the bolts 44 and the nuts 45 to the lower section 74L (FIG. 4) of the dashboard upper part 16 in close contact with the lower section 74L, as best shown in FIG. 8. The center member 86 has a thickness Tb (see FIG. 10, too).

Referring again to FIG. 6, the second half 91 has a right edge defining the partition wall 62. The center member 86 includes an inner fastening/welding portion 95 contiguous with the right partition wall 62. The inner fastening/welding portion 95 is fastened by means of the bolts 44 and the nuts 45 to the lower section 74R of the dashboard upper part 16 in close contact with the lower section 74R.

The center member 86 includes front and rear edges defining weld edges 96, 96 spot-welded to the front part 66 of the body 65 of the dashboard upper part 16 in close contact with the front part 66. The second half 91 has right and left sides defining right and left weld portions 97, 97, respectively. The right and left side weld portions 97, 97 are welded to the right and left side members 87R, 87L (FIG. 4).

The inner fastening/welding portion 93 of the center member 86 has two holes 98, 98 formed therethrough in concentric relation to the two holes 83, 83 of the lower section 74L (FIG. 4). The inner fastening/welding 95 of the center member 86 has two holes 98 formed therethrough in concentric relation to the two holes 83 of the lower section 74R (FIG. 4).

Referring to FIG. 4 and FIG. 7, each of the right and left side members 87R, 87L includes a joining portion 101 overlying and joined to the corresponding one of the right and left weld portions 97, 97, an upper portion 102 contiguous with the joining portion 101, and an outer fastening/welding portion 103 contiguous with the upper portion 102.

The upper portion 102 of the left side member 87L lies in substantially parallel to the top plate portion 47 (FIG. 2) of the left damper housing 25L and defines an upper layer of the left damper-fastening structure 55L. The upper portion 102 of the right side member 87R lies in substantially parallel to the top portion 47 of the right damper housing 25R and defines an upper layer of the right damper-fastening structure 55R.

The upper portion 102 of the left side member 87L is located a predetermined height Hs (which is substantially equal to a height H of the left partition wall 62 of the center member 86) above the outer fastening/welding portion 103 of the left side member 87L. The upper portion 102 of the right side member 87R is located a height (which is substantially equal to the right partition wall Hs) above the outer fastening/welding portion 103 of the right side member 87R.

The left side member 87L has a sidewall 104 (see also FIG. 8) contiguous with the upper portion 102. The right side member 87R has a sidewall 104 contiguous with the upper portion 102. Each sidewall 104 has the height H. The side member 87 has a thickness Ts (FIG. 8).

Each of the upper portions 102, 102 has a second hole 106 formed therethrough in concentric relation to the associated one of the holes 51, 51 of the right and left damper housings 25R, 25L shown in FIG. 2, and two holes 107 formed between the second hole 106 and the joining portion 101 for allowing a tool to pass through the holes 107 for tightening the nut 45 to the bolt 44 so as to secure the respective shock absorbers 23, 23 to the respective damper housings 25R, 25L and the dashboard panel assembly as described hereinbefore. The upper portion 102 of the left side member 87L has a tip-passing hole 108 formed on an engine space side of the second hole 106 for allowing a tip of a spot-welding device to pass through the hole 108 for spot-welding the weld area 84 of the left lower section 74L of the dashboard upper part 16 to the left damper housing 25L. The upper portion 102 of the right side member 87R also has a tip-passing hole 108 formed in the same manner as the hole 108 of the upper portion 102 of the left side member 87R.

The outer fastening/welding portion 103 of the left side member 87L has three holes 111 formed therethrough in correspondence to the three holes 82 of the left lower section 74L. The outer fastening/welding portion 103 of the right side member 87R has also three holes 111 formed in the same manner as the three holes 111 of the outer fastening/welding portion 103 of the left side member 87L.

The right side member 87R is disposed symmetrically to the left side member 87L with respect to a center line Cm.

Discussion will be made with reference to FIG. 4 and FIG. 6 as to a manner of assembling the reinforcing beam member 17.

First, the center member 86 is set on a beam-assembling jig (not shown), and then, the right and left side members 87R, 87L are set rightwardly and leftwardly of the center member 86, respectively.

Secondly, the left side member 87L is coupled to the center member 86 with the joining portion 101 spot-welded to the left weld portion 97 at three welded portions 113. Finally, the right side member 87R is coupled to the center member 86 with the joining portion 101 spot-welded to the right weld portion 97 at three welded portions 114. This completes the assemblage of the reinforcing beam member 17.

As shown in FIG. 8, the left damper-fastening structure 55L is fastened to the attachment flange 43 by means of the bolts 44 and the nuts 45, with the top plate portion 47 and the adhesive 53 interposed between the structure 55L and the attachment flange 43.

The left damper housing 25L includes an upper part to which the dashboard upper part 16 is attached. The left side member 87L attached to the left side of the center member 86 covers an upper part of the left damper housing 25L. The left side member 87L, the dashboard upper part 16 and the upper part of the left damper housing 25L define a closed cross-sectional structure. This closed cross-sectional structure has its top and bottom spaced from each other a distance substantially equal to the height H of the sidewall 104 of the left side member 87L.

In FIG. 8, the adhesive 53 is shown as having a uniform thickness for the purpose of clarity. The front part 66 of the dashboard upper part 16 is held in direct contact with the left damper housing 25L. The right damper-fastening structure 55R (FIG. 4) has the same arrangement as the left damper-fastening structure 55L shown in FIG. 8.

As shown in FIG. 8, the left side member 87L and the lower section 74L of the front part 66 of the dashboard upper part 16 jointly define the left damper-fastening structure 55L. The front part 66 of the dashboard upper part 16 and the center member 86 jointly define the beam 58 of closed cross-sectional configuration (see FIG. 10, too).

Figure 9:
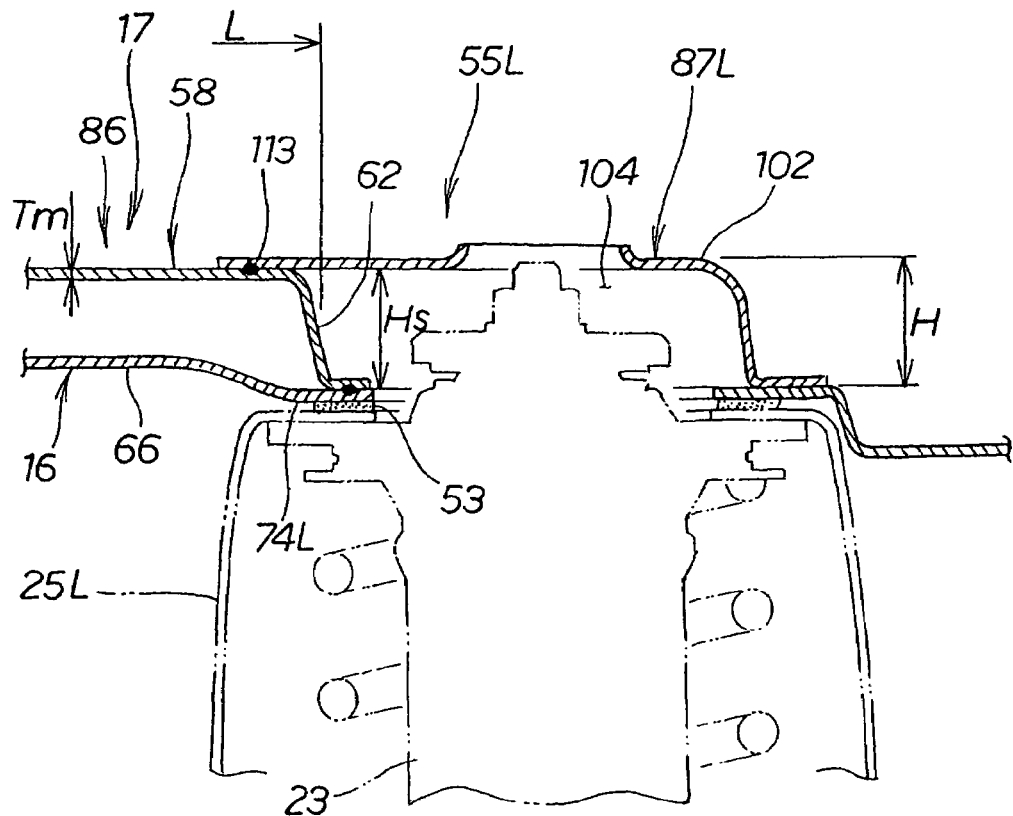
FIG. 9 is a cross-sectional view taken along line 9-9 of FIG. 2.

Referring again to FIG. 8, the front part 66 of the dashboard upper part 16 has a thickness Td. The center member 86 of the reinforcing beam member 17 has a thickness Tm equal to the thickness Td, as shown in FIG. 9. The left side member 87L of the reinforcing beam member 17 has a thickness Ts equal to the thickness Td. These thicknesses Td, Tm, Ts are small so as to lighten a shock-absorber-supporting structure formed by the front part 66 and the reinforcing beam member 17.

The left damper-fastening structure 55 has the sidewall 104 of height H set so as to increase the strength of the shock-absorber-supporting structure.

The closed cross-sectional beam part 58 defined by the front part 66 and the center member 86 is located between the right and left damper housings 25R, 25L increases the strength of the shock-absorber-supporting structure.

The adhesive 53 is interposed between the top plate portion 47 of the damper housing 25L and the front part 66 of the dashboard upper part 16, as best shown in FIG. 8. This adhesive 53 prevents rainwater or the like having reached the first hole 81 of the lower section 74L of the front part 66 from entering the engine space 21.

The beam 58 includes the right and left partition walls 62, 62 of height Hs defined between the center portion and a right edge of the beam 58 and between the center portion and a left edge of the beam 58, respectively. The partition walls 62, 62 are located above the right and left damper housings 25R, 25L. The provision of the partition walls 62, 62 increases section modulus of the beam 58, thereby providing sufficient strength to withstand a load applied from the shock absorber through the left damper housing 25L to the left damper-fastening structure 55.

As shown in FIG. 5, the front part 66 has a center located between the right and left damper housings 25R, 25L. The center of the front part 66 includes the front erected rib 77 having the maximum height Hr. The front erected rib 77 increases the strength of the front part 66, thereby increasing the strength of the shock absorber-supporting structure.

As shown in FIG. 1 and FIG. 5, the front part 66 is spot-welded to the right and left damper housings 25R, 25L at the weld areas 84, 84. The use of the spot welding omits the need for bolts and nuts, thereby lightening the vehicle body front part structure 11 and reducing the cost of manufacture of the structure 11.

By providing the dashboard upper part 16 and the reinforcing beam member 17 (i.e. by providing the dashboard panel assembly) thus arranged discussed above, the right and left damper-fastening structures 55R, 55L and the beam 58 of closed cross-section can be defined in the engine space 21 of small volume without requiring other components.

Figure 11:
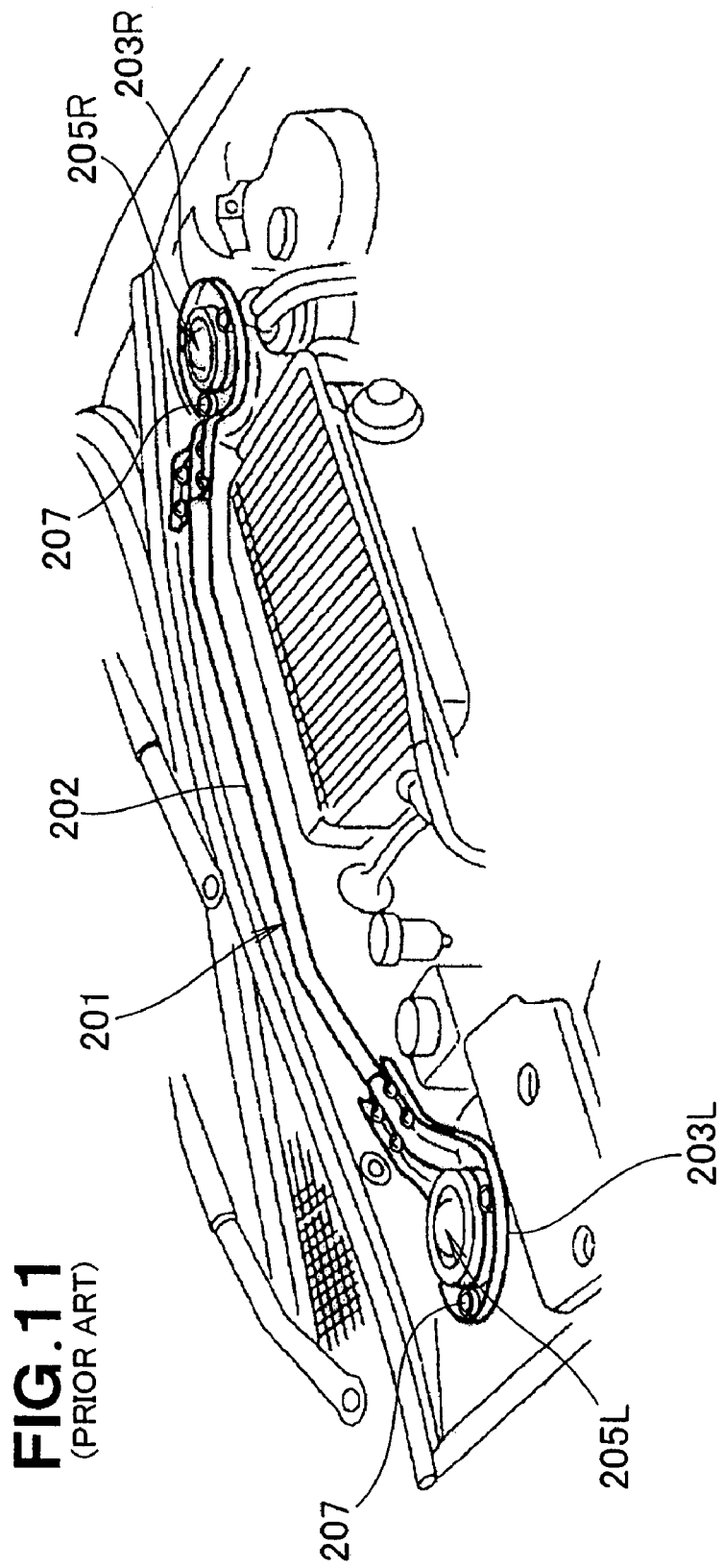
FIG. 11 is a view showing in perspective a conventional bar assembly interconnecting right and left strut towers.

The right and left damper-fastening structures 55R, 55L and the beam 58 of closed cross-section can be attached to the right and left damper housings 25R, 25L less troublesomely than the strut tower bar such as the pipe found in FIG. 11.

Obviously, various minor changes and modifications of the present invention are possible in light of the above teaching. It is therefore to be understood that within the scope of the appended claims the invention may be practiced otherwise than as specifically described.

What is claimed is:

1. A front part structure of a vehicle body, comprising:
   a dash panel partitioning a passenger compartment and an engine space;
   a dashboard upper part disposed on an upper part of the dash panel in such a manner as to extend laterally of the vehicle body; and
   right and left damper housings to which upper parts of shock absorbers are allowed to be attached, the damper housings forming sidewalls that partly define the engine space,
   wherein the dashboard upper part includes:
   a front part forming a fore-part of the dashboard upper part and extending laterally of the vehicle body to the right and left damper housings; and
   a reinforcing beam member attached to the right and left damper housings and lying on the front part so as to form, jointly with the front part, a beam part having a first closed cross section and extending between the right and left damper housings.

2. The front part structure of claim 1, further comprising an adhesive interposed between the dashboard upper part and each of the right and left damper housings.

3. The front part structure of claim 1, wherein the beam part comprises partition walls each positioned between a longitudinally-central part of the beam part and a respective end of the beam part to be attached to the right or left damper housing.

4. The front part structure of claim 1, wherein the reinforcing beam member comprises a center member laid on the dashboard upper part to thereby define a second closed cross section continuous with the first closed cross section.

5. The front part structure of claim 3, wherein the reinforcing beam member comprises a center member and the partition walls are provided at opposite ends of the center member.

6. The front part structure of claim 4, wherein the reinforcing beam member further comprises right and left side members attached to opposite ends of the center member and covering upper parts of the right and left damper housings, to which upper parts the dashboard upper part is attached, and the second closed cross section extends from the right and left side members to the upper parts of the right and left damper housings.

* * * * *